No. 694,175. Patented Feb. 25, 1902.
W. NEWMAN.
BELT GEARING.
(Application filed Oct. 1, 1901.)
(No Model.) 2 Sheets—Sheet 1.
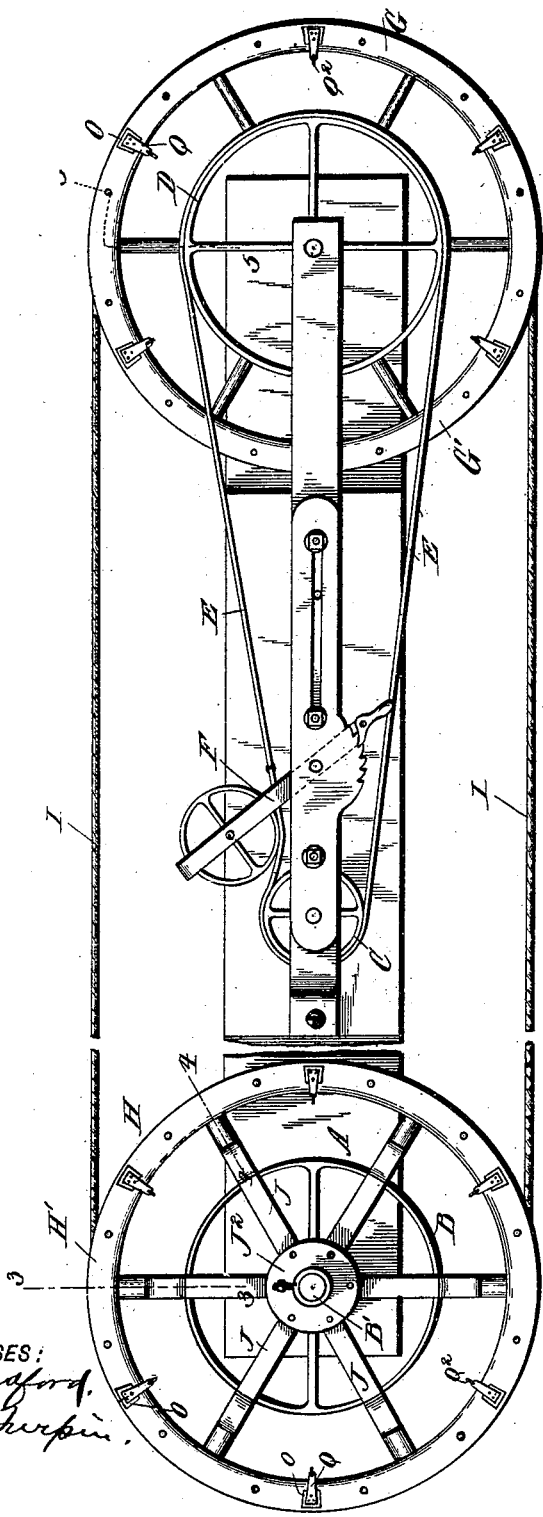
WITNESSES:
INVENTOR
William Newman.
BY
ATTORNEYS No. 694,175. Patented Feb. 25, 1902.
W. NEWMAN.
BELT GEARING.
(Application filed Oct. 1, 1901.)
(No Model.) 2 Sheets—Sheet 2.
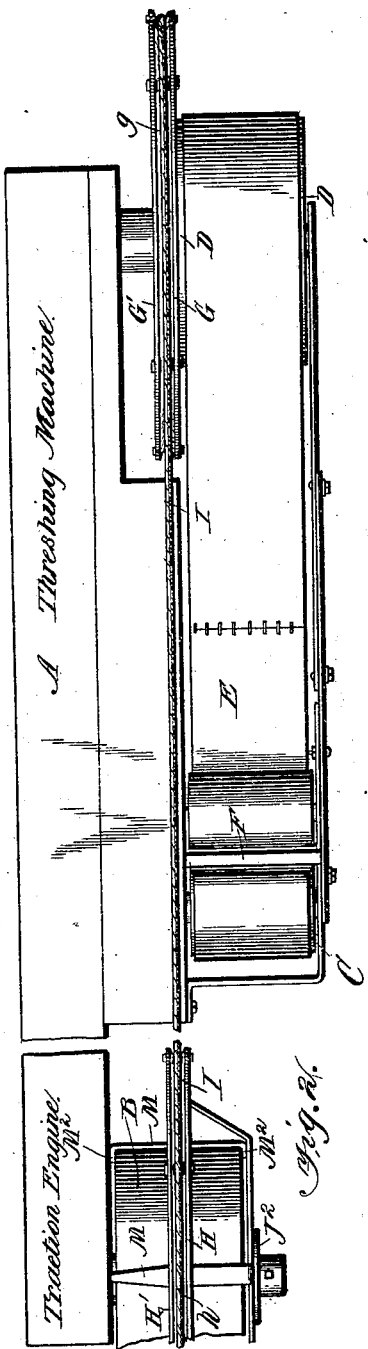
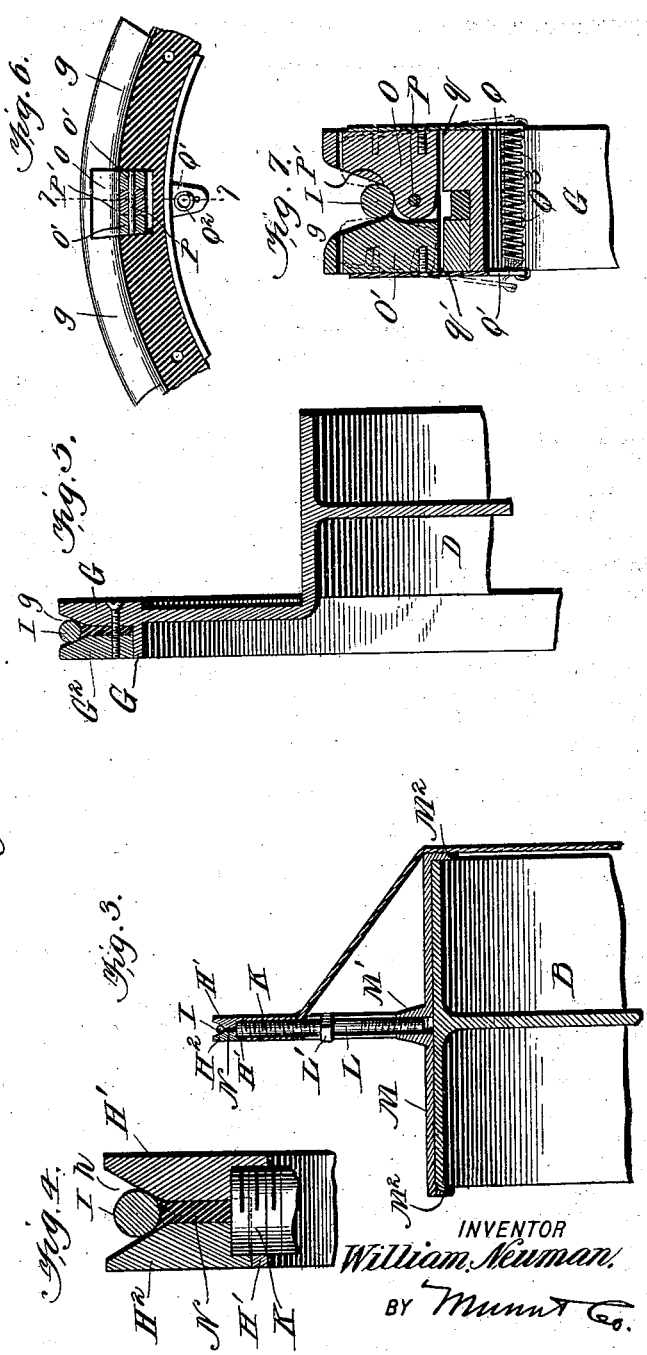
WITNESSES:
INVENTOR
William Newman,
BY Munn & Co.
ATTORNEYS
THE NORRIS PETERS CO., PHOTO-LITHO., WASHINGTON, D. C.

UNITED STATES PATENT OFFICE.

WILLIAM NEWMAN, OF ALEXANDRIA, SOUTH DAKOTA.

BELT-GEARING.

SPECIFICATION forming part of Letters Patent No. 694,175, dated February 25, 1902.

Application filed October 1, 1901. Serial No. 77,215. (No model.)

*To all whom it may concern:*

Be it known that I, WILLIAM NEWMAN, a citizen of the United States, residing at Alexandria, in the county of Hanson and State of South Dakota, have made certain new and useful Improvements in Belt-Gearing for Threshing-Machines, of which the following is a specification.

My invention is an improvement in belt-gearing for use on threshing-machines, and has for an object to provide a novel construction whereby to dispense with the long drive-belt usually employed in driving threshing-machines and to utilize in lieu thereof a cable or rope, preferably of wire; and the invention consists in certain novel constructions and combinations of parts, as will be hereinafter described and claimed.

In the drawings, Figure 1 is a side elevation of my improvements, partly broken away. Fig. 2 is a top plan view of the construction shown in Fig. 1, partly broken away. Fig. 3 is a detail cross-sectional view on about line 3 3 of Fig. 1. Fig. 4 is a cross-sectional view on about line 4 4 of Fig. 1. Fig. 5 is a cross-sectional view on about line 5 5 of Fig. 1. Fig. 6 is a detail circumferential section drawn through the rope-ring. Fig. 7 is a detail cross-section on about line 7 7 of Fig. 6.

In the use of threshing-machines, especially in connection with traction-engines for driving the same, much difficulty results from the long belt which connects the threshing-machine and engine being blown off by the wind. I aim to overcome this difficulty by transmitting the power between the engine and the machine by a wire cable, and in the practice of my invention it becomes necessary to use large band wheels or rings for the wire, so the cable will not be bent too short in rounding the wheels, which is apt to result in excessive wear on the cable. I therefore employ large band-rings in connection with the traction-engine and the threshing-machine to drive the latter, as will be more fully described.

In carrying out my invention I employ a frame A, which may be supported in connection with a threshing-machine, as shown in Fig. 2.

The band-pulley B is the pulley of a traction or other engine for driving the threshing-machine. The pulley C is the pulley on the shaft of a threshing-machine cylinder. The pulley D is a band-pulley similar to the pulley B and geared by the belt E with the pulley C, and as the said belt E is a short one I provide a tightener F, which can be operated to keep the belt E at the desired tension. Now to avoid the necessity of a long belt I employ a large rope-ring G around and in connection with the belt-pulley D, and this rope-ring may be made integral with the pulley D or suitably secured thereto in any desired manner. I also employ a large rope-ring H, equal in diameter with the ring G and secured to the band-pulley B; but I prefer to make the pulley H separate from the pulley B, so the said ring H may be applied to the pulley B in use on the engine and can be adjusted to and secured upon wheels of different diameters, so the invention can be applied to any ordinary threshing plant now in use. The rings G and H are connected by the rope or cable I, as shown in Fig. 1, and the said rings G and H are grooved in their rims and may be provided with means for gripping the cable, as will be presently described. It will be noticed from the foregoing that the cable employed in transmitting the power from the engine to the thresher will afford only a slight surface for the wind to operate on, and by operating in grooved surfaces of the rings and being clamped therein there is little or no danger of the cable being displaced by the wind. In securing the ring H upon the pulley B, I prefer to provide the said ring with spokes J, which have the laterally-extending arms at their juncture with the rings H, so said rings can be located centrally over the band-ring B, and the spokes J unite at their inner end in a hub $J^2$, which can be keyed upon the shaft B' of the pulley B in any suitable manner. I also provide the ring H, preferably within the outer ends of the spokes J, as shown, with inwardly-opening sockets K, in which turn the outer ends of the bolts L, said bolts having right-hand screws on one end and left-hand screws on their other ends and having centrally at L means for the connection of a wrench or other device whereby they may be turned. I also provide base-bars M, provided at M', opposite the sockets K, with threaded sockets for the inner ends of the bolts L and having at their ends lugs M² to overlap the opposite edges of the rim of the wheel B. It will be understood from this construction that by operating the screws L the ring H may be clamped upon the wheel B, and the lateral bend of the spokes J will permit the fitting of the said ring to wheels B of different diameters, as well as the location of the said ring H on the central line of the wheel B, as before suggested.

In order to aid in the traction of the cable I and to afford a cushioning-surface therefor, I provide in the base of the groove $h$ of the ring H and the groove $g$ of the ring G rubber strips N, which are preferably secured by making the rings G and H in sections H', H², G', and G², as shown in Figs. 4 and 5, and clamping the rubber strips N between the said sections. I also find it desirable to employ on the rings G and H the grips shown in detail in Fig. 6 and 7 and including the opposite sections O and O', which are pivoted together at P, so they can rock, as indicated in dotted lines in Fig. 7, and having the projecting portions at P', which can be operated upon by the cable, so the pressure of the cable will operate to cause the sections O and O' to move inwardly at their upper ends and bind upon the cable so long as the latter presses upon the sections O and O'. The sections O and O' are provided with the inwardly-projecting arms Q and Q', which are connected by the spring Q³, so the clamping-sections O and O' will be opened by the spring Q³ when the pressure of the cable is removed from the said sections. The arms Q and Q' fulcrum at $q$ and $q'$ against the ring and permit the movement of the sections O and O' into and out of gripping position. I employ these cable-grips on both rings G and H, and ordinarily I find it desirable to use about six of the grips on each ring. Manifestly the grips O and O' may be used in connection with the rubber strip N, or said parts may be used independently, as desired.

In Fig. 2 I illustrate generally the arrangement of the several parts in connection with the engine and thresher. It will be noticed that my invention is easily applied for use and will efficiently serve the purpose for which it is intended, enabling the convenient gearing of a thresher and a drive-engine by means of a wire or other cable or rope which will not be displaced by the wind, thus avoiding the delay and inconveniences resulting from the displacement of the belt by the wind, as before referred to.

It will be understood in practice the combination-pulley D and G may be attached in any suitable position on the side of the thresher where there is room and where it will not interfere with the other pulleys, the bearing of said combination-pulley being securely fastened to the frame of the thresher and any suitable provision being made for lubricating the said combination-pulley as may be desired.

It may be necessary in practice to cross the belt E in order to drive the pulley C in the proper direction; but manifestly this will depend upon the relation and direction of the several pulleys.

In applying my improvements to a threshing-machine the drive-wheels may be set in or out and the cylinder-pulley may be moved in or out to come in line with the band-wheel on the large drive-wheel, and in the different separators the wheels will have to be placed where most convenient, as experience will show, and it will be understood that the castings and supporting parts, including the longitudinally-adjustable brace, which runs from the cylinder-pulley to the end of the bearing on the large drive-wheel and supports the tightener, may be varied in construction to suit the frames of the different separators.

Having thus described my invention, what I claim as new, and desire to secure by Letters Patent, is—

1. A rope pulley-ring having its rim grooved and provided with grips operating in the said ring and composed of opposite sections pivoted together and arranged to grip the cable within the groove, said sections being provided with inwardly-projecting arms, and springs connecting the opposite arms of the grips, substantially as set forth.

2. The combination of the band-wheel, the rope pulley-ring arranged over the band-wheel and having the spokes provided with the laterally-extending portions, the inwardly-opening threaded sockets in the pulley-ring, the base-bars fitting to the rim of the pulley-wheel, and provided with threaded sockets, and the screws operating in said sockets and in the sockets of the pulley-ring, substantially as set forth.

3. The combination of the band-wheel, the rope pulley-ring extending around the band-wheel, and bolts operating between the band-wheel and pulley-ring and clamping the pulley-ring in place on the band-wheel substantially as set forth.

4. The combination of the wheel the pulley-ring arranged over the wheel and having the inwardly-opening sockets, the base-bars fitted to the wheel and provided with threaded sockets, and the screws operating in said sockets substantially as set forth.

5. The combination with the threshing-machine-cylinder pulley of a band-wheel, a band connecting said pulley and wheel, and a pulley-ring fitted upon the band-wheel and formed to receive a cable for connection with the drive-engine, substantially as set forth.

WILLIAM NEWMAN.

Witnesses:
P. A. ZOLLMAN,
LOUISE ZOLLMAN.